United States Patent
Oertel et al.

(10) Patent No.: US 10,218,599 B2
(45) Date of Patent: *Feb. 26, 2019

(54) IDENTIFYING REFERRAL PAGES BASED ON RECORDED URL REQUESTS

(71) Applicant: Google LLC, Mountain View, CA (US)

(72) Inventors: Phillip Oertel, San Francisco, CA (US); Swaminathan Krishnamurthy, San Jose, CA (US); Zaid Ateeq Mian, Fremont, CA (US); Christopher J. Park, San Jose, CA (US); Mattias Bo Erland Granlund, Korsholm, FL (US); Amin Ahmad, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/263,961

(22) Filed: Sep. 13, 2016

(65) Prior Publication Data

US 2016/0380875 A1    Dec. 29, 2016

Related U.S. Application Data

(63) Continuation of application No. 13/785,672, filed on Mar. 5, 2013, now Pat. No. 9,477,644.
(Continued)

(51) Int. Cl.
  *G06F 17/30* (2006.01)
  *G06F 15/173* (2006.01)
  (Continued)

(52) U.S. Cl.
  CPC ............ *H04L 45/02* (2013.01); *G06F 15/173* (2013.01); *G06F 17/217* (2013.01); *G06F 17/30* (2013.01);
  (Continued)

(58) Field of Classification Search
  CPC ........ G06F 17/30; G06F 15/173; G06Q 30/00
  (Continued)

(56) References Cited

U.S. PATENT DOCUMENTS

| | | | |
|---|---|---|---|
| 7,373,614 B1 | 5/2008 | Holmes | |
| 7,984,500 B1 * | 7/2011 | Khanna | G06F 21/552 709/225 |

(Continued)

OTHER PUBLICATIONS

Ayers, et al. Using Graphic History in Browsing the World Wide Web, Proceedings of he International Conference on World Wide Web, pp. 451-459, Dec. 1, 1995.
(Continued)

*Primary Examiner* — Cesar B Paula
*Assistant Examiner* — Jian Huang
(74) *Attorney, Agent, or Firm* — Foley & Lardner LLP

(57) ABSTRACT

A system for pagination of data based on recorded URL requests, includes a data store comprising a computer readable medium storing a program of instructions for performing the pagination of data based on recorded URL requests; a processor that executes the program of instructions; a data segmentation module to receive a log of the URL requests, and to segment the log for a specific source; a referral tree construction module to construct a referral tree for the specific source based on the segmented log and HTTP referrer fields associated with the log; a tree enhancement module to enhance the referral tree based on site-specific rules; a signal computation module to perform signal computation on a plurality of nodes associated with the enhanced referral tree; a classification module to identify each of the plurality of nodes subsequent to the signal computation is performed on the enhanced referral tree; and a page construction module to construct a web page based on the enhanced referral tree subsequent to the classification module identifying the plurality of nodes.

20 Claims, 5 Drawing Sheets

Related U.S. Application Data

(60) Provisional application No. 61/710,199, filed on Oct. 5, 2012.

(51) Int. Cl.
*H04L 12/751* (2013.01)
*G06F 17/21* (2006.01)
*H04L 1/00* (2006.01)
*H04L 29/08* (2006.01)

(52) U.S. Cl.
CPC ........ *G06F 17/3089* (2013.01); *H04L 1/0018* (2013.01); *H04L 67/02* (2013.01); *H04L 67/22* (2013.01); *H04L 67/2842* (2013.01); *H04L 67/146* (2013.01)

(58) Field of Classification Search
USPC ............................................ 715/234; 705/30
See application file for complete search history.

(56) References Cited

U.S. PATENT DOCUMENTS

| | | | |
|---|---|---|---|
| 9,456,050 B1* | 9/2016 | Lepeska | H04L 67/2847 |
| 9,477,644 B1* | 10/2016 | Oertel | G06F 17/3089 |
| 2002/0042821 A1* | 4/2002 | Muret | G06Q 30/06 |
| | | | 709/223 |
| 2003/0229900 A1 | 12/2003 | Reisman | |
| 2006/0074984 A1 | 4/2006 | Milener et al. | |
| 2008/0091820 A1 | 4/2008 | Norman et al. | |
| 2009/0043661 A1* | 2/2009 | Chong | G06Q 30/0273 |
| | | | 705/14.69 |
| 2009/0327863 A1* | 12/2009 | Holt | G06Q 30/02 |
| | | | 715/234 |
| 2011/0239103 A1* | 9/2011 | Mercuri | G06F 17/30861 |
| | | | 715/234 |
| 2011/0246270 A1 | 10/2011 | Krywolt | |

OTHER PUBLICATIONS

International Preliminary Report on Patentability dated Apr. 16, 2015 in PCT Application No. PCT/US2013/062948.
International Search Report dated Jan. 3, 2014 in PCT Application No. PCT/US2013/062948.
Notice of Allowance on U.S. Appl. No. 13/785,672 dated Jun. 16, 2016.
Notice of Allowance on U.S. Appl. No. 13/785,672 dated Jul. 14, 2016.
Office Action on U.S. Appl. No. 13/785,672 dated Nov. 23, 2015.
Office Action on U.S. Appl. No. 13/785,672 dated Mar. 19, 2015.
Office Action on U.S. Appl. No. 13/785,672 dated Jul. 30, 2015.

* cited by examiner

300

Data Segmentation Module
310

Referral Tree Construction Module
320

Tree Enhancement Module
330

Signal Construction Module
340

Classification Module
350

Page Construction Module
360

FIG. 3

IDENTIFYING REFERRAL PAGES BASED ON RECORDED URL REQUESTS

CROSS-REFERENCE TO RELATED APPLICATION

This application is a continuation of, and claims priority to and the benefit of U.S. patent application Ser. No. 13/785,672, filed Mar. 5, 2013, titled "IDENTIFYING REFERRAL PAGES BASED ON RECORDED REQUESTS" EFFICIENT PREVENTION OF FRAUD" which in turns claims priority to U.S. Patent Application No. 61/710,199, filed Oct. 5, 2012, titled "PAGINATION OF DATA BASED ON RECORDED URL REQUESTS" which are hereby incorporated herein by reference in their entirety for all purposes.

BACKGROUND

A user's web browser contains information of web sites the user has accessed. The web browser can demarcate sites that the user has entered into an address bar of the web browser from sites that the user has clicked-through on various web sites. This information may be referred to as a user's "browser history". The browser history serves as an indication of how the user interacts with the Internet.

By understanding how a user interacts with the Internet, an analysis of the user's interests and preferences may be improved. Thus, a service or a content provider may direct relevant advertisements and content towards the individual user based on an individual user's browser history.

A user, when interacting with the Internet, may transmit various requests to a server. The server receives a universal resource location (URL), and instructs a retrieval of information from the web site that the URL is directed to. Alternatively, the server may relay the URL to another device to perform the retrieval.

At a router or proxy, which may be used to access the server, a web meter may be implemented to record data of the user's stream of URL requests and response headers. From the recorded data, a web meter may obtain a complete set of web sites visited by a user.

SUMMARY

A system for pagination of data based on recorded URL requests, includes a data store comprising a computer readable medium storing a program of instructions for performing the pagination of data based on recorded URL requests; a processor that executes the program of instructions; a data segmentation module to receive a log of the URL requests, and to segment the log for a specific source; a referral tree construction module to construct a referral tree for the specific source based on the segmented log and HTTP referrer fields associated with the log; a tree enhancement module to enhance the referral tree based on site-specific rules; a signal computation module to perform signal computation on a plurality of nodes associated with the enhanced referral tree; a classification module to identify each of the plurality of nodes subsequent to the signal computation is performed on the enhanced referral tree; and a page construction module to construct a web page based on the enhanced referral tree subsequent to the classification module identifying the plurality of nodes.

DESCRIPTION OF THE DRAWINGS

The detailed description refers to the following drawings, in which like numerals refer to like items, and in which:

FIG. 3 illustrates a system for pagination;

DETAILED DESCRIPTION

A web meter records URL requests from a user or user's terminal. From the requests received, the web meter maintains a record of all the web sites the user accesses. The recorded web sites merely represents all the web sites the user accesses, and does not differentiate between web sites that were entered into an address bar of a web browser and ancillary data associated with the web site. For example, ancillary data may be elements placed on a web site, such as shared content that is sourced from a third party source. Thus, by merely reviewing the recorded URL requests, a web meter cannot reconstruct a browser history.

Disclosed herein are methods and systems for reconstructing a user's browser history, thereby improving the analysis of a user's interaction with the Internet. The aspects disclosed herein employ statistical data, time-based information, and specific web site rules to estimate a specific user's or device's browser history. An entity that benefits by understanding a user's interaction may realize an increase in revenue based on the improvements to the analytics of the user's interaction with the Internet.

In situations in which the systems discussed here collect personal information about users, or may make use of personal information, the users will be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
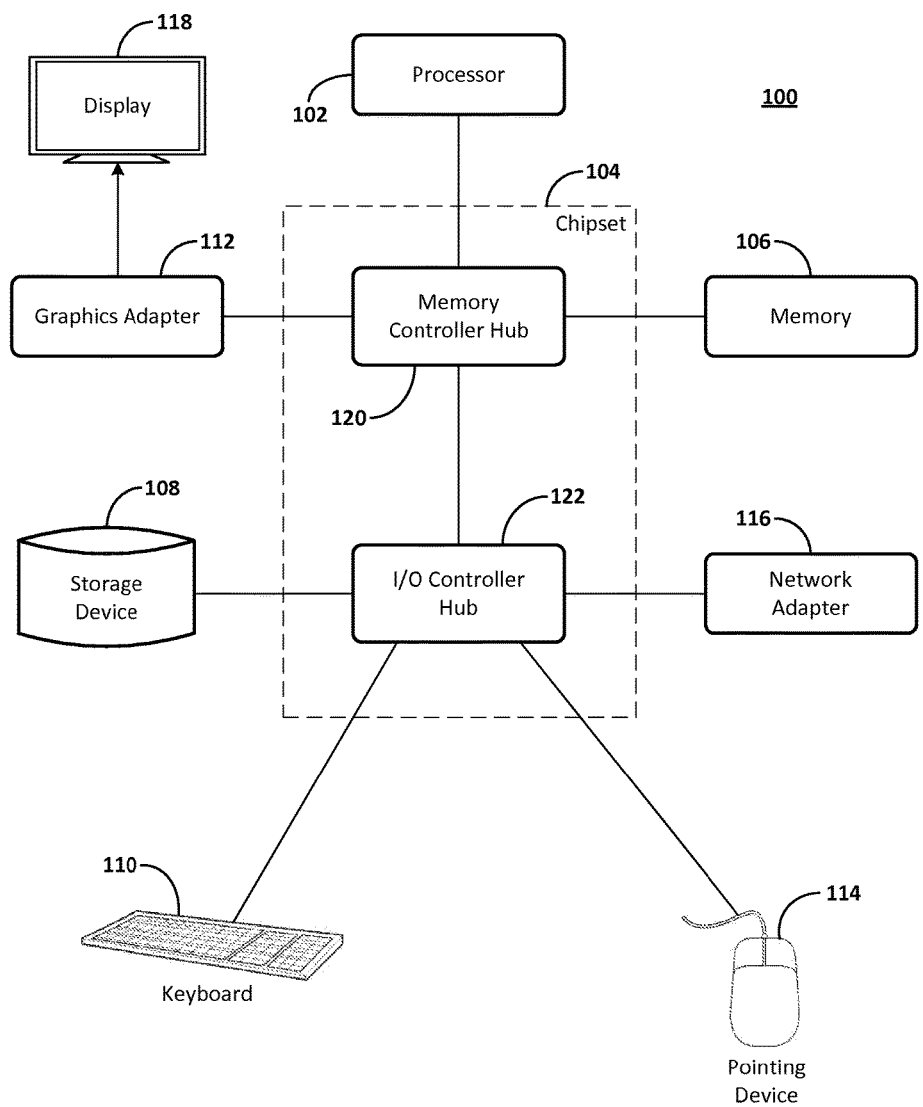
FIG. 1 is a high-level block diagram illustrating an example computer.

FIG. 1 is a high-level block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, table, smartphone or any sort of computing element with the above-listed elements. For example, a video corpus, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
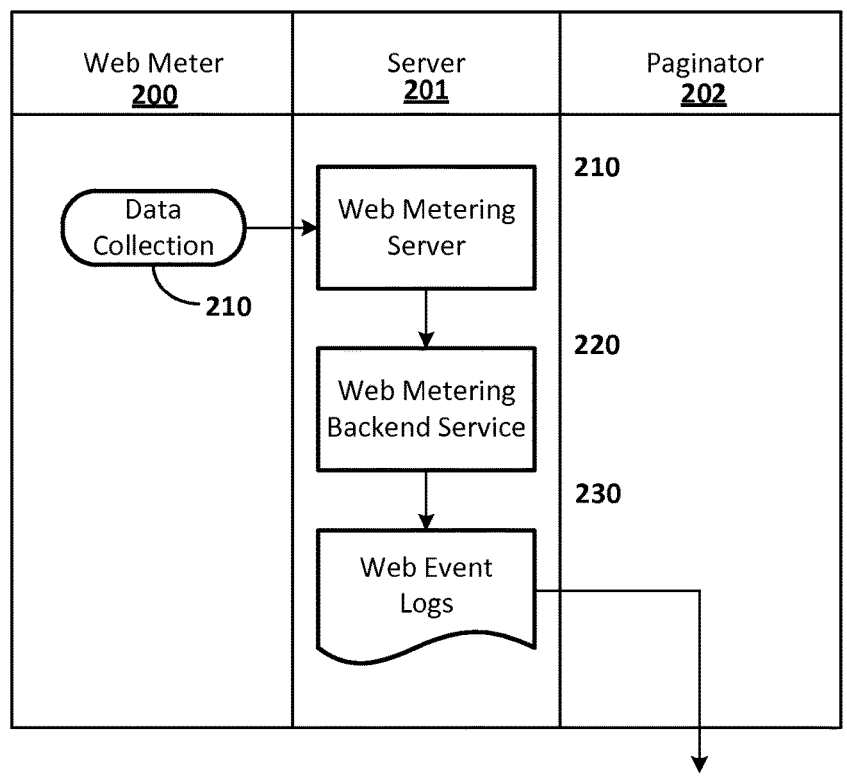
FIG. 2 illustrates a flow chart directed to a method for pagination.

FIG. 2 illustrates a method for recording data of accesses to the Internet by a user or device. The method according to FIG. 2 may be implemented on computer 100. The method of FIG. 2 utilizes three modules: a web meter 200, a server 201, and a paginator 202. The three modules of FIG. 2 may be implemented as stand-alone components on computer 100, or may be integrated as a single system. For example, the web meter 200 may be implemented on a device other than the device hosting server 201. The server 201 is a router or proxy that facilitates the communication of requests to an external network.

In operation 210, the web meter 200 records URL requests sent by a user or user's terminal that connects to the server 201. Thus, as explained above, the web meter 200 records a list of URL requests. This information is communicated to the server 201. The web meter 200 may also record which device or user generated the request.

In operation 220, the information communicated from the web meter 200 to the server 201 is then transmitted to a web metering back-end service (installed on the server 201). Thus, the raw data collected by the web meter 200 in operation 210 may be processed by the web metering back-end service.

In operation 230, the information transmitted in operation 220 is processed into a log by the server 201. The log may indicate various items of information, such as: the URL associated with the access, the access time, and the user or device that requested the URL. The server 201 may transmit the log to the paginator 202. The log generated in operation 230 may be generated in a format suitable for the paginator 202.

FIG. 3 illustrates a system for pagination 300. The system 300 includes a data segmentation module 310, a referral tree construction module 320, a tree enhancement module 330, a signal computation module 340, a classification module 350, and page construction module 360.

The data segmentation module 310 receives a log, such as the log produced in operation 230. The information in the log is segmented according to a source of data generation. This ensures that the data is segmented for a specific user and/or device. The segmentation may also be done per a specific or predefined time period, such as an hour, day or month.

The referral tree construction module 320 receives the segmented data from the data segmentation module, and constructs a referral tree for a specific user or device using HTTP referrer fields contained in the log. In constructing the referral tree, the referral tree construction module 320 may avoid duplicate node entries caused by web sites that autoload multiple times. Additionally, system 300 may allow the plugging-in of various techniques and modules for aiding the construction of a referral tree. The referral tree construction module 320 may accomplish this by using time-based rules to exclude ancillary data that is recorded within a predefined time. Thus, in an ancillary data element makes multiple requests, the time-based rule may detect that the multiple accesses are sourced from the same ancillary data element. Additionally, the referral tree construction node may rely on hypertext markup language (HTML) code for specific web sites to determine a logical connection between each node of the referral tree. Thus, the referral tree construction module 320 may determine that two nodes are connected to each other because the nodes are referenced to each other in one or both of the web pages associated with the nodes.

The enhancement module 330 receives the referral tree from the referral tree construction module 320, and enhances the referral tree by incorporating site specific rules, timing analysis and content analysis, to synthesize an enhanced referral tree. Additionally, system 300 allows plugging-in various statistical and machine-learning algorithms to synthesize an enhanced referral tree.

The signal computation module 340 receives the enhanced referral tree from the enhancement module 330, and performs a signal computation over every node in the enhanced referral tree. The signal computation may analyze the nodes by taking into account other techniques, such as an internet crawler's index, and location information. Some of the nodes may be analyzed by the URL associated with the node, while other nodes may take into account other factors, such as a depth of the tree or a parent lag time. Alternatively, or in addition to, some of the nodes may be analyzed based on a dependency of the node to a third party site, such as an online advertisement network.

The classification module 350 receives the enhanced referral tree from the signal computation module 340, and identifies each node as a node corresponding to a user entered URL, or a node that does not correspond to a user entered URL.

The page construction module 360 receives the classified referral tree from the classification module 350, and performs a determination of various page boundaries based on at least the classified referral tree corresponding to user entered URL addresses. A page boundary refers to a web page and corresponding elements, such as advertisements and content, which are embedded or associated with the web page.

Figure 4:
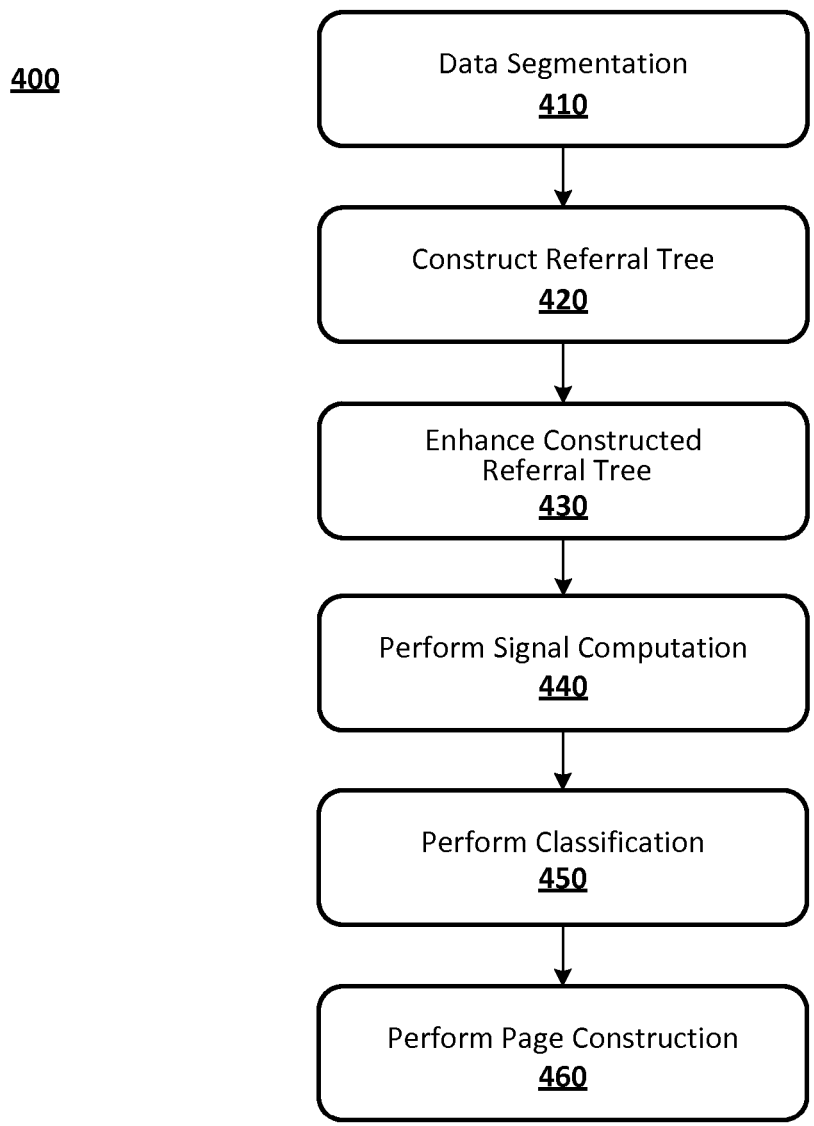
FIG. 4 illustrates a method for pagination of a server log via a paginator.
Figure 5A:
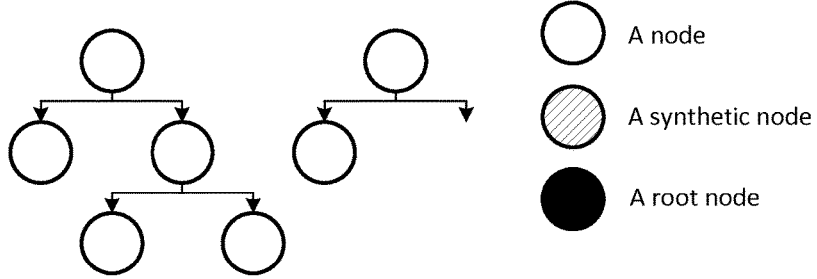
FIGS. 5A-5C illustrate the transformation of a tree-based data structure according to the pagination illustrated in FIG. 3.
Figure 5B:
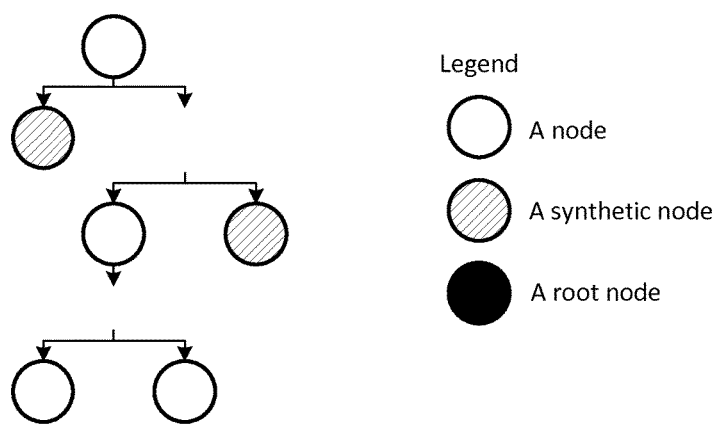
Figure 5C:
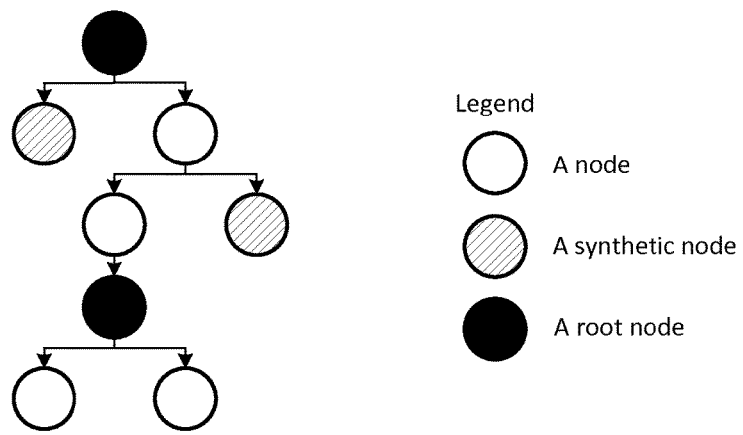

FIG. 4 illustrates a method for pagination of a server 201 log via system 300. The method according to FIG. 4 may be implemented on computer 100. The log may the log generated in operation 230. FIGS. 5A-5C illustrate the transformation of a tree-based data structure according to the pagination illustrated in FIG. 4. In FIGS. 5A-5C, each node represents a URL recorded by the web meter 200, with a corresponding pattern associated with each URL indicating an activity that generated the recorded URL.

In operation 410, a data segmentation of the log is performed. The information in the log is segmented according to a source of data generation, such as a specific user or device. This ensures that the data is segmented for a specific user or device. The segmentation may also be done per a specific or predefined time period, such as an hour, day or month.

In operation 420, after the data segmentation of the log is performed, a referral tree is constructed. The referral tree is constructed using HTTP referrer fields contained in the log. A HTTP referrer field identifies a source address of a destination URL. In constructing the referral tree, the system 300 may avoid duplicate node entries caused by web sites that auto-load multiple times. The system 300 may accomplish this by using time-based rules to exclude URLs that occur within a predefined time. An illustration of the referral tree is depicted in FIG. 5A. In referral tree 5A, each node of the tree represents a distinct URL request. The various connections, connecting each node, represents an estimated logical connection between the URLs. These estimated logical connections may be ascertained by the HTTP referrer fields, or by a technique of reviewing the HTML source code of a web site associated with the node to determine if various nodes link to each other.

In operation 430, the referral tree generated in operation 420 is enhanced. The referral tree generated in operation 420 may be incomplete due to various factors. For example, if a web browser caches web site information, the access to a web site may not be recorded. For example, a popular video sharing web site may access the video player from cache. Thus, web meter 200 may never record an access to the video player URL.

In operation 430, the referral tree may be enhanced by incorporating site specific rules, timing analysis and content analysis to synthesize an enhanced referral tree. As shown in FIG. 5B, an enhanced referral tree contains two types of nodes. The first type of node represents node information generated in operation 420. The second type of node refers to synthesized nodes. Synthesized nodes are inferred by the enhancement described in operation 430. In FIG. 5B, the two types of nodes are represented by a different pattern respectively. The system 300 ascertains how the recorded URLs interconnect with the synthesized nodes, thereby constructing the enhanced referral tree shown in FIG. 5B.

In operation 440, the system 300 performs a signal computation over every node in the enhanced referral tree. The signal computation may analyze the nodes by taking into account other methods, such as an internet crawler's index and location information. Some of the nodes may be analyzed by the URL associated with the node, while other nodes may take into account other factors such as a tree depth or a parent lag time. Alternatively, or in addition to, some of the nodes may be analyzed based on a dependency of the node to a third party site, such as an online advertisement network.

After various signal computations are performed on the tree, in operation 450, the system 300 may classify the various nodes based on the signal computation performed on each node. Thus, nodes may be identified as nodes that were entered into by a user in a web browser, rather than nodes associated with ancillary data on a web page, nodes that were clicked-through on the web page, or nodes that refer to URLs of automatically generated data. A classified enhanced referral tree is shown in FIG. 5C. In FIG. 5C, nodes that are solid represent URLs that a user entered into a web browser's address bar, while the other nodes (depending on the pattern), represent either a synthesized node or a click-through URL.

Various techniques may be employed to aid in the classification in operation 450, such as Boltzmann machines, deep neural nets, auto encoder-based neural nets, k-means, rule-based systems (including deductive and inductive systems), decision trees and random forests.

In operation 460, the system 300 may perform a page construction. Based on the classified referral tree generated in operation 450, the system 300 may be able to determine which nodes are elements on a web page associated with a node associated with a user entering a URL. Thus, for example, in operation 460, the page constructor may determine if certain advertisements and content are actual elements on a web page. In operation 460, a page construction is described as being performed by using the referral tree; however, the page construction may be performed with, or augmented by, additional data (e.g. temporal) or statistical processes to determine page boundaries.

Certain of the devices shown in FIG. 1 include a computing system. The computing system includes a processor (CPU) and a system bus that couples various system components including a system memory, such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 2 and 4. The disclosed devices, components, and systems contemplate using or implementing any suitable technique for performing the steps illustrated in these figures. Thus, FIGS. 2 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A method, comprising:
   receiving, by a computing system, a request from a client device for a first item of content corresponding to a first node of a referral tree, the request having a referrer field identifying a second item of content corresponding to a second node of the referral tree;
   determining, by the computing system, that the first node is not connected with the second node;
   identifying, by the computing system, a synthetic node of the referral tree connected to the first node;
   determining, by the computing system, that the synthetic node is also connected to the second node;
   determining, by the computing system, based on the identification, that the client device has retrieved a locally-cached copy of a third item of content associated with the synthetic node of the referral tree without the request for the third item of content transmitted via the computing system, responsive to determining that the first node is not connected to the second node and to determining that the synthetic node is connected to the first node and the second node; and
   recording, by the computing system, a request for the third item of content by the client device.

2. The method of claim 1, wherein determining that the first node is not connected with the second node comprises determining that no direct path exists between the first node and second node in the referral tree.

3. The method of claim 1, wherein identifying the synthetic node of the referral tree connected to the first node further comprises identifying a node of the referral tree generated based on a request extracted from the second item of content.

4. The method of claim 1, wherein identifying the synthetic node of the referral tree connected to the first node further comprises identifying a node of the referral tree generated based on a reference to an additional item of content extracted from the second item of content.

5. The method of claim 1, wherein identifying the synthetic node of the referral tree connected to the first node further comprises identifying a lag in received requests from client devices accessing the second item of content.

6. The method of claim 1, wherein determining that the synthetic node is also connected to the second node further comprises determining that the synthetic node is connected to the second node via an additional one or more intermediary synthetic nodes.

7. The method of claim 1, further comprising determining, by the computing system, that the second node is identified in the referral tree as representing a first request for the second item of content; and determining, by the computing system, that the synthetic node is identified as representing a request for a locally-cached copy of an item of content.

8. A system, comprising:
   a computing device comprising a memory storage device storing a referral tree, a network interface in communication with a client device, and a processor executing a log enhancement module;
   wherein the network interface is configured for receiving a request from the client device for a first item of content corresponding to a first node of a referral tree, the request having a referrer field identifying a second item of content corresponding to a second node of the referral tree; and wherein the log enhancement module is configured for:
- determining that the first node is not connected with the second node,
- identifying a synthetic node of the referral tree connected to the first node,
- determining that the synthetic node is also connected to the second node,
- determining, based on the identification, that the client device has retrieved a locally-cached copy of a third item of content associated with the synthetic node of the referral tree without the request for the third item of content transmitted via the computing system, responsive to determining that the first node is not connected to the second node and to determining that the synthetic node is connected to the first node and the second node, and
- recording a request for the third item of content by the client device.

9. The system of claim 8, wherein the log enhancement module is further configured for determining that no direct path exists between the first node and second node in the referral tree.

10. The system of claim 8, wherein the log enhancement module is further configured for identifying a node of the referral tree generated based on a request extracted from the second item of content.

11. The system of claim 8, wherein the log enhancement module is further configured for identifying a node of the referral tree generated based on a reference to an additional item of content extracted from the second item of content.

12. The system of claim 8, wherein the log enhancement module is further configured for identifying a lag in received requests from client devices accessing the second item of content.

13. The system of claim 8, wherein the log enhancement module is further configured for determining that the synthetic node is connected to the second node via an additional one or more intermediary synthetic nodes.

14. The system of claim 8, wherein the log enhancement module is further configured for determining that the second node is identified in the referral tree as representing a first request for the second item of content; and determining that the synthetic node is identified as representing a request for a locally-cached copy of an item of content.

15. A non-transitory computer readable medium comprising instructions that, when executed by the processor of a computing device, cause the processor to:

- determine, responsive to receiving a request from a client device for a first item of content corresponding to a first node of a referral tree, the request having a referrer field identifying a second item of content corresponding to a second node of the referral tree, that the first node is not connected with the second node;
- identify a synthetic node of the referral tree connected to the first node;
- determine that the synthetic node is also connected to the second node;
- determine, based on the identification, that the client device has retrieved a locally-cached copy of a third item of content associated with the synthetic node of the referral tree without the request for the third item of content transmitted via the computing system, responsive to determining that the first node is not connected to the second node and to determining that the synthetic node is connected to the first node and the second node; and
- record a request for the third item of content by the client device.

16. The computer readable medium of claim 15, wherein the instructions, when executed, further cause the processor to determine that no direct path exists between the first node and second node in the referral tree.

17. The computer readable medium of claim 15, wherein the instructions, when executed, further cause the processor to identify a node of the referral tree generated based on a request extracted from the second item of content or based on a reference to an additional item of content extracted from the second item of content.

18. The computer readable medium of claim 15, wherein the instructions, when executed, further cause the processor to identify a lag in received requests from client devices accessing the second item of content.

19. The computer readable medium of claim 15, wherein the instructions, when executed, further cause the processor to determine that the synthetic node is connected to the second node via an additional one or more intermediary synthetic nodes.

20. The computer readable medium of claim 15, wherein the instructions, when executed, further cause the processor to determine that the second node is identified in the referral tree as representing a first request for the second item of content; and determine that the synthetic node is identified as representing a request for a locally-cached copy of an item of content.

* * * * *